March 30, 1965  R. D. KREHBIEL  3,175,580
CONTROL VALVE FOR AT LEAST TWO HYDRAULIC MOTORS
Filed Feb. 9, 1962  6 Sheets-Sheet 1

INVENTOR.
Robert D. Krehbiel
BY Hubert Miller
ATTORNEY

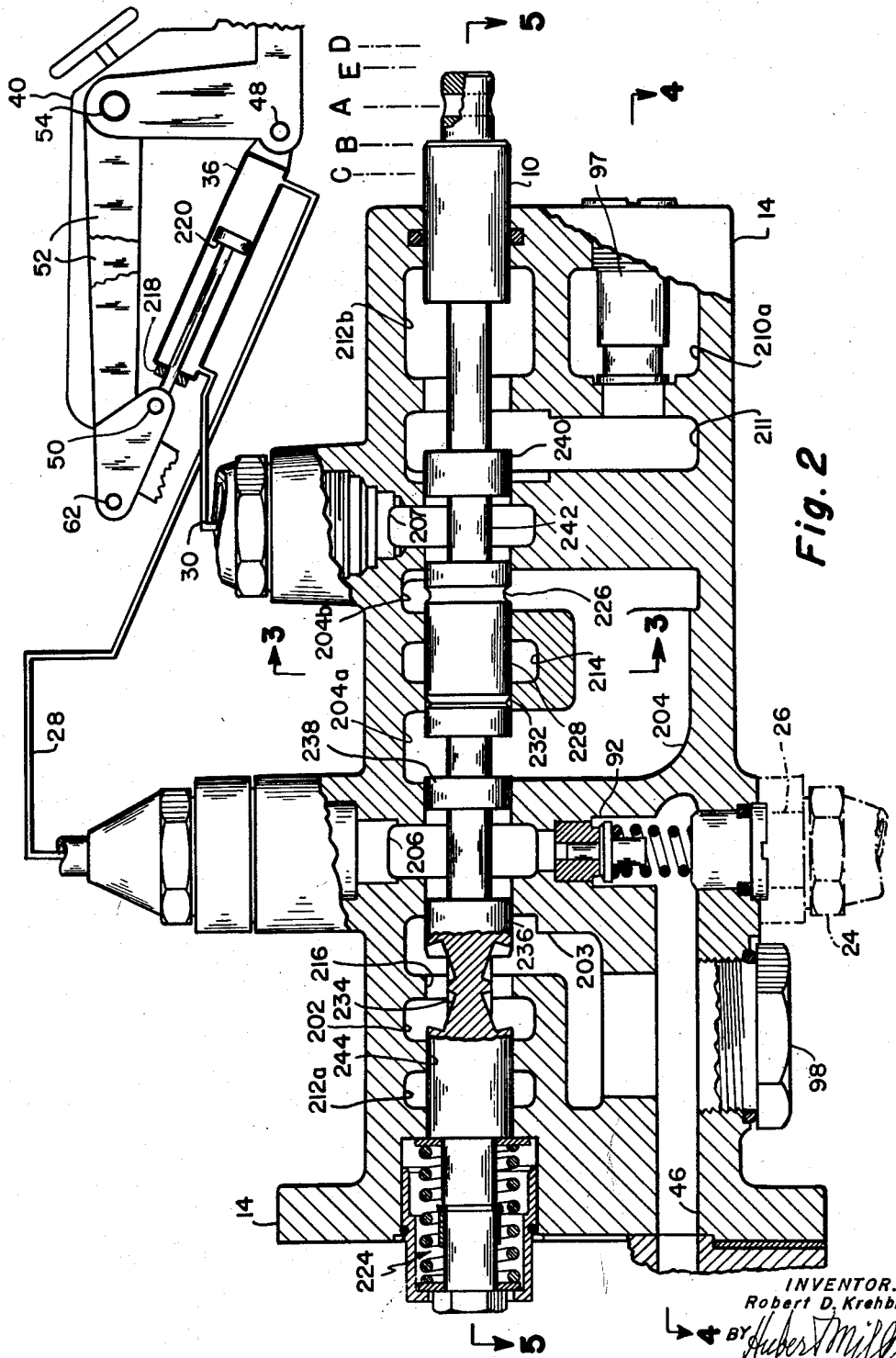

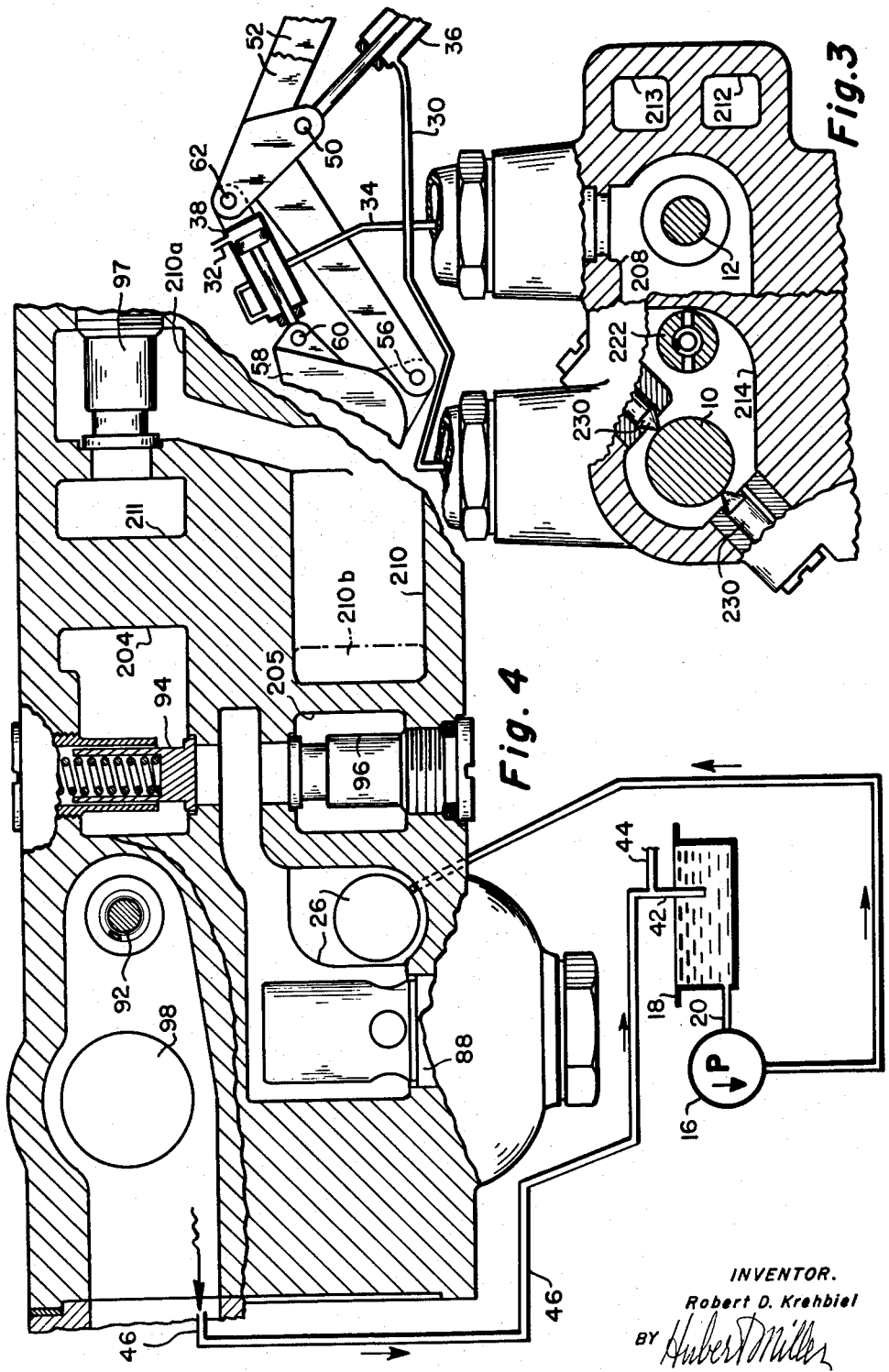

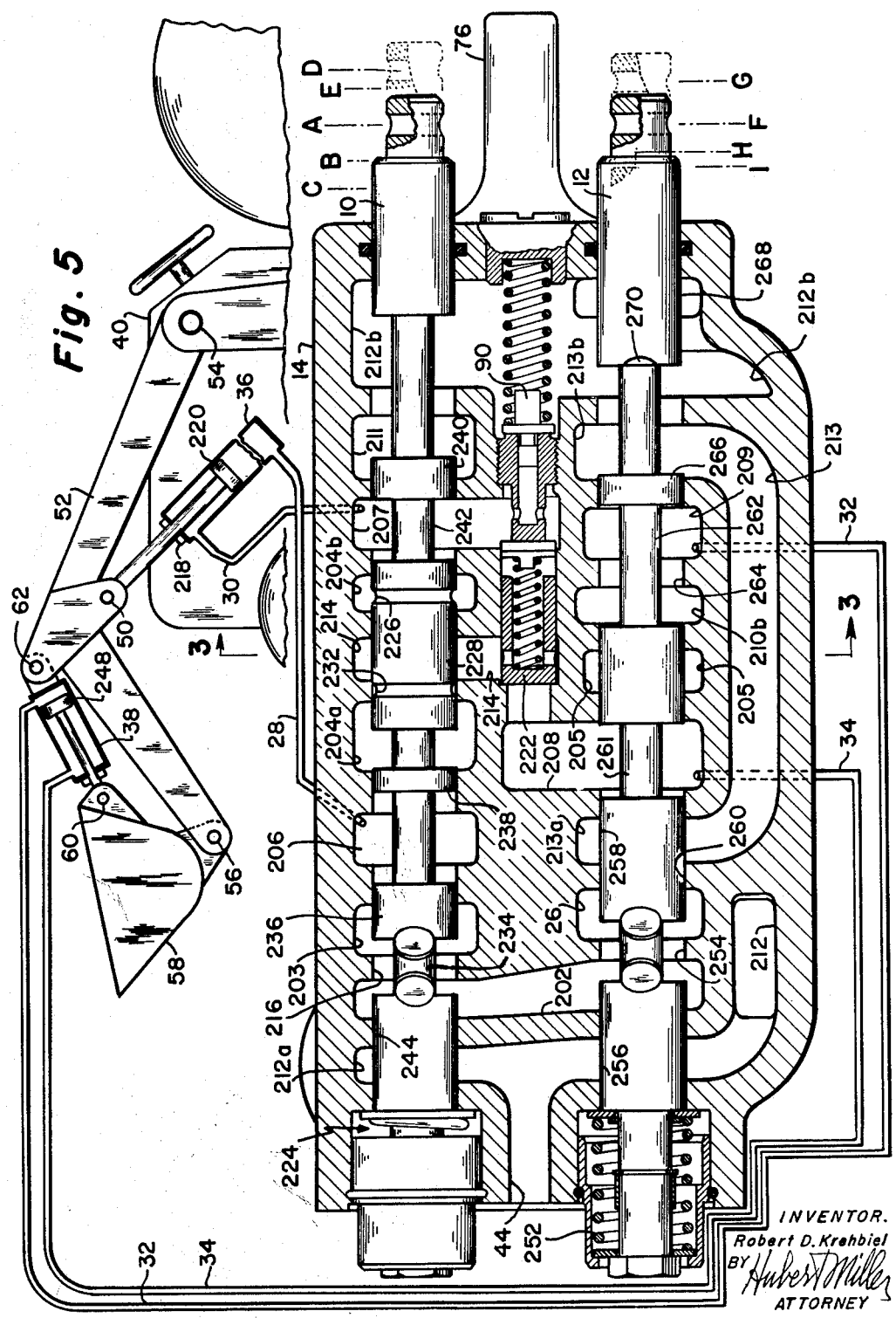

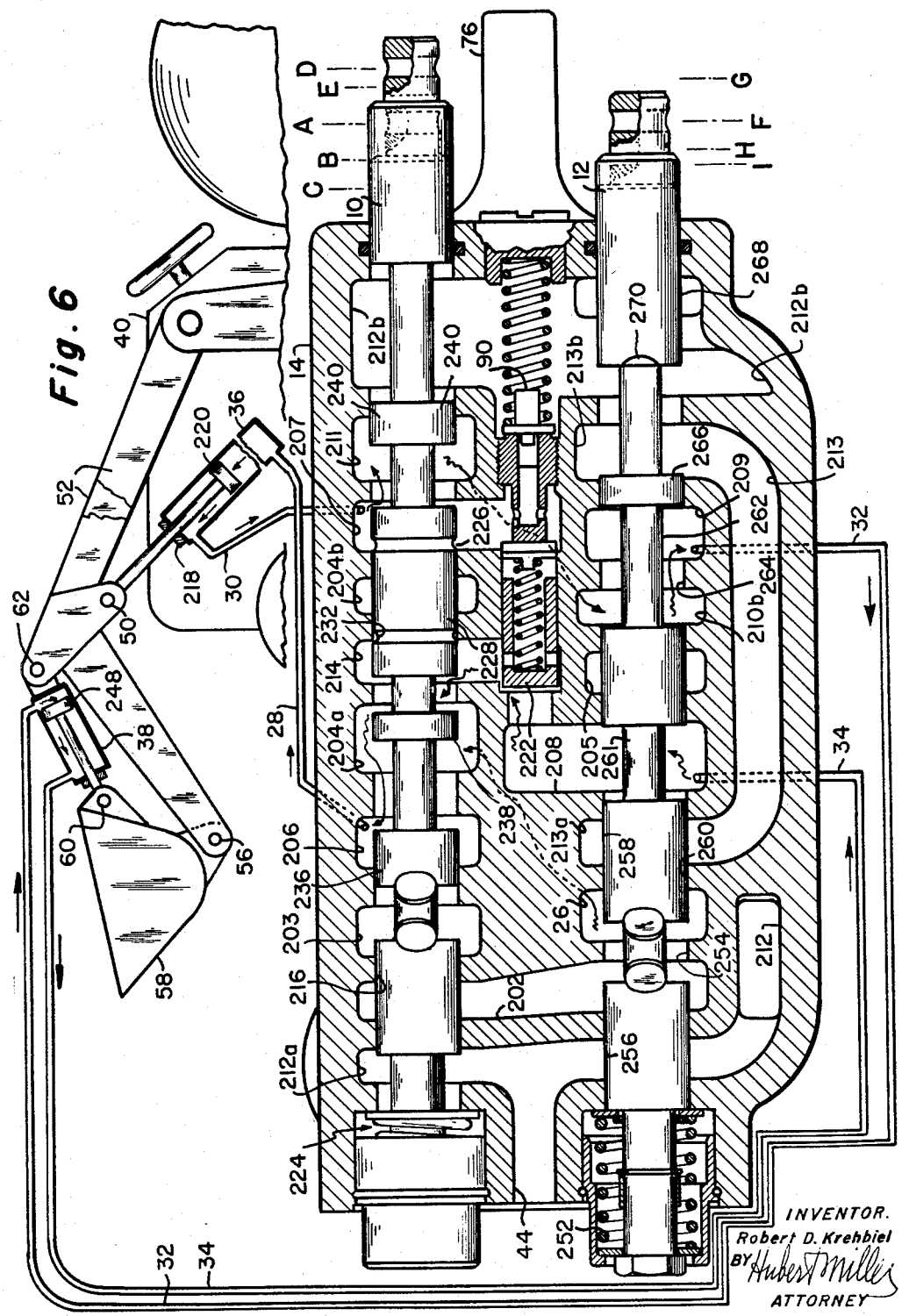

March 30, 1965   R. D. KREHBIEL   3,175,580
CONTROL VALVE FOR AT LEAST TWO HYDRAULIC MOTORS
Filed Feb. 9, 1962   6 Sheets-Sheet 6

INVENTOR.
Robert D. Krehbiel
BY Hubert Miller
ATTORNEY

United States Patent Office 3,175,580
Patented Mar. 30, 1965

3,175,580
CONTROL VALVE FOR AT LEAST TWO
HYDRAULIC MOTORS
Robert D. Krehbiel, Hutchinson, Kans., assignor to The
Cessna Aircraft Company, Wichita, Kans., a corporation of Kansas
Filed Feb. 9, 1962, Ser. No. 172,340
7 Claims. (Cl. 137—596.12)

This invention pertains to a power operated loader or like apparatus for handling earth, bulk articles, and other material. It relates to the hydraulic system for operating such apparatus and more particularly, to a so-called loader valve in which is adapted to control fluid flow in the system and in which the essential components are a minimum in number and grouped in a single housing.

Loaders are provided with an up-and-down swinging boom, the boom being supported by a tractor or other vehicle, and supporting at its swinging end a pivoted bucket. A hydraulic system provides the source of power according to the practice and includes a piston and cylinder motor connected between the boom and tractor and a separate piston and cylinder motor connected between the boom and bucket and together effective to position the bucket properly for digging, lifting, and dumping a load.

Individual control over the bucket and boom cylinders is essential at times, and therefore it is the practice to provide separate operator controlled valve members for controlling the cylinders. An experienced operator, though not altogether without difficulty, can manipulate both members by appropriate adjustments at the same time so as to keep the loaded bucket level while he is moving it into the elevated position by raising the boom. This bucket is disposed at the forward terminal of the boom in a front mounted or front end loader and the operator must keep slowly tilting the bucket and load away from the boom, i.e. in the dumping direction, as the bucket is lifted by the boom. Hence, a further difficulty is involved requiring the operator's care to keep the bucket from floating or drifting forwardly at a fast rate or else the weight of the load will cause the bucket to tip prematurely and dump too soon.

The present invention overcomes the foregoing and other difficulties in a novel manner. Separate valve spool members produce the individual control necessary and yet, as provided herein, they are consolidated in a single valve housing with the shiftable valve spools in adjacent sections.

A primary object of the present invention is the provision of a single shiftable valve spool in the boom control section of the housing, having a position in which it coordinates the two valve sections to place the boom and bucket cylinders hydraulically in series; in this way movement of a single shiftable valve spool control lever by the operator provides simultaneous boom raising and predetermined bucket movement at a rate maintaining the bucket substantially level in all positions of the raising boom. This inherent self-leveling operation of the bucket permits the operator to move the boom at a much faster rate as well as in an automatic and fool-proof manner.

More particularly, the hydraulic cylinders according to this invention are connected at the head end and at the opposite or rod end in a manner wherein extension of the boom, cylinder raises the boom and partial extension of the bucket cylinder maintains the bucket level as the boom raises; full extension of the bucket cylinder dumps the bucket. The consolidated function of the valve allows it to place the rod-connected end (comparatively small displacement) of each cylinder hydraulically in series with the large displacement head end of the other cylinder so that the displaced fluid establishes a so called regenerative circuit rather than directly exhausting into a fluid return line. Under these circumstances, fluid supplied to the head end of the bucket cylinder is the fluid being displaced from the rod-connected end of the boom cylinder, and therefore the bucket cylinder extends at a proportionately slow rate, continuing to keep the bucket substantially level so that the load does not spill over the front.

Input fluid to the system is supplied directly from a fluid source to the head end of the boom cylinder, and by the regeneration referred to the volume of this fluid is augmented by the discharge of the fluid from the rod-connected end of the bucket cylinder. This increase of supply accomplishes two important things by providing first, a faster boom raise and second, a back pressure which is maintained on the bucket cylinder preventing the bucket from floating into a dumping position due to urgings of the weight of the load tending to swing the bucket forwardly. I thus provide a built-in self-regulating effect to the leveling operation, enabling the rod-connected end of the boom cylinder to replenish fluid in the cylinder of the bucket motor at a rate to obviate cavitation behind the piston.

The boom valve of my invention has, besides the above position, additional individual positions causing the cylinder to raise, to lower, and to float the boom. A companion bucket valve has a bucket curl position in which the bucket cylinder retracts, and a power down and a fast dump position in which the bucket cylinder extends but at differing rates.

In the individual cylinder controlling positions of the preceding paragraph, the present two-valve control obviates other difficulties as will now be explained. Objects and advantages of the invention are either specifically pointed out or become apparent, when the following description is read in conjunction with the accompanying drawings which form a part hereof and in which:

FIG. 2 is a longitudinal sectional view of the boom valve taken in side elevation along the lines 2—2 of FIG. 1.

FIG. 3 is a transverse sectional view generally but not precisely along the locator lines 3—3 of FIG. 2.

FIGS. 4 and 5 are longitudinal sectional views in plan taken along the section lines 4—4 and 5—5 of FIG. 2.

Figure 7:
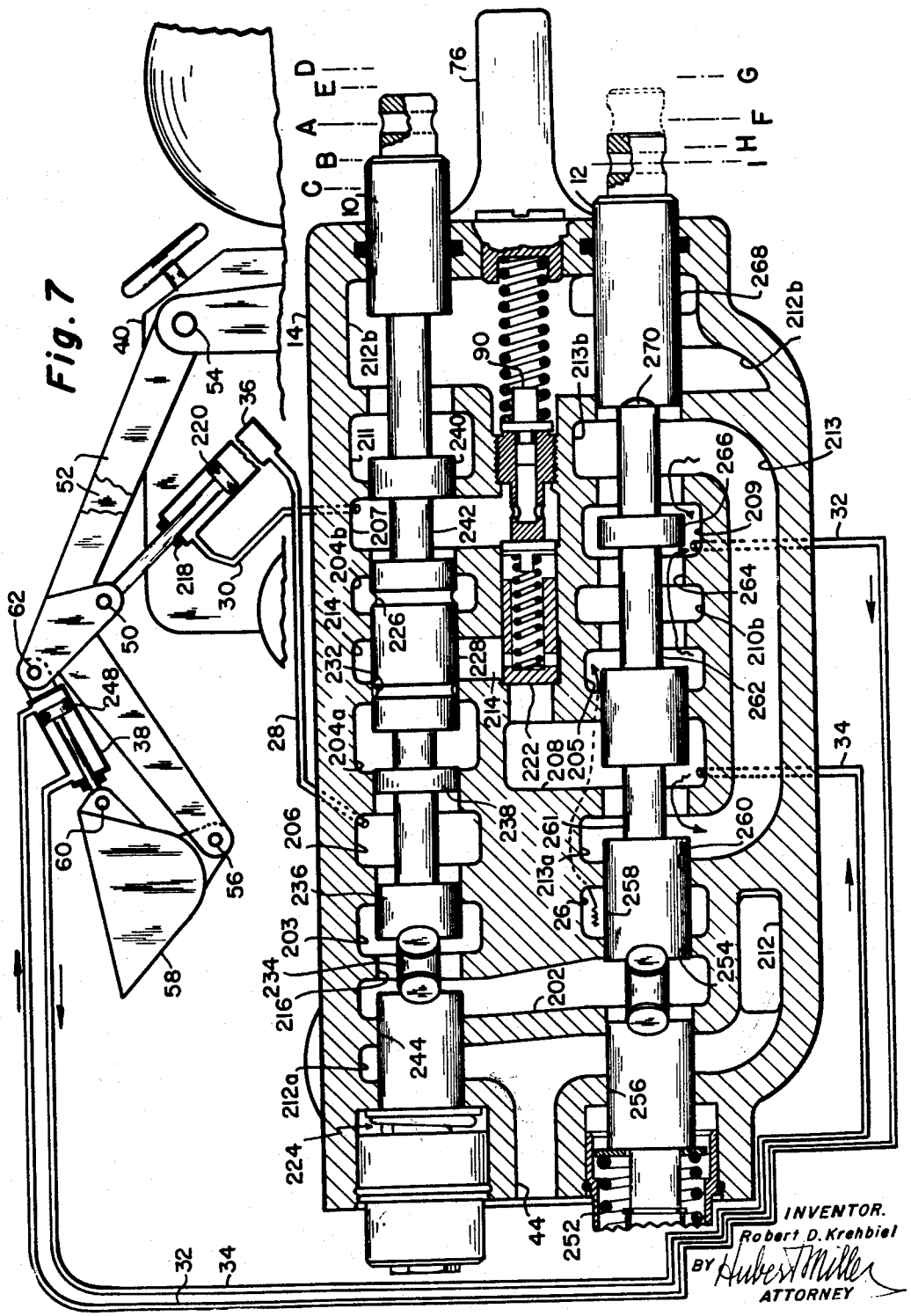

FIGS. 6 and 7 are views similar to FIG. 5 showing the valves of the unit in various operating positions.

Figure 1:
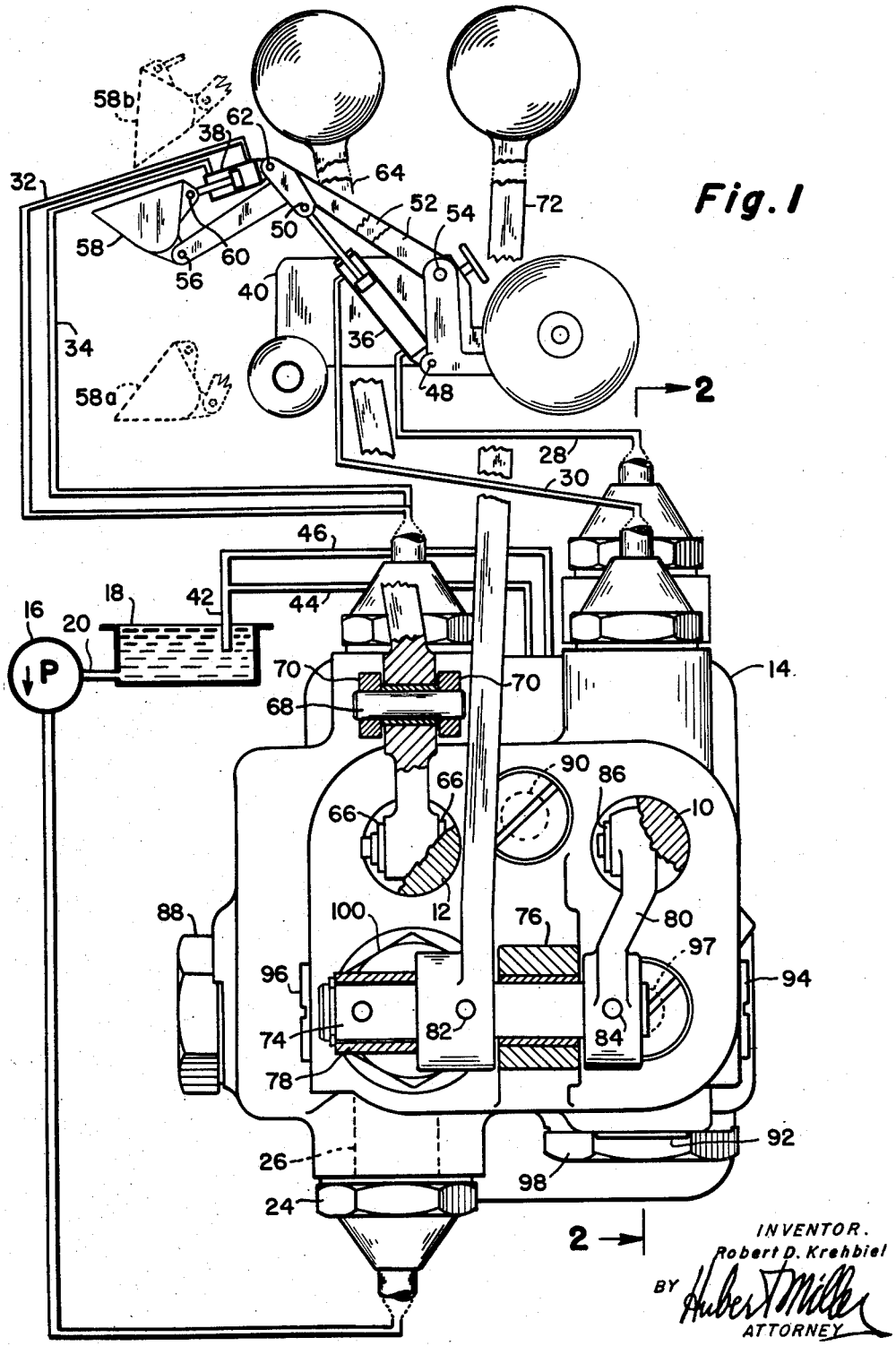
FIG. 1 is a view in elevation taken from the operator's position, showing the control valve unit of a hydraulic power system which as schematically illustrated is applied to a front end tractor loader.

While the individual spools 10 and 12 of the valve unit 14 shown in FIG. 1 and elsewhere in the drawings, are specifically designed for open center operation and consequently include a so called zig-zag type neutral bypass port through which fluid may continuously flow from the pump discharge to the reservoir when there is no demand on the system, it will be understood by those familiar with this art that the invention described herein is equally adapted to spool valves and other valve elements having no neutral bypass passage, i.e. closed center valves.

Except for the fluid flow control system and a valve unit 14 of FIG. 1 and other figures in the drawing, the hydraulic system and the tractor mounted front end loader mechanism shown schematically herein are considered conventional. A positive displacement pump 16 is supplied with oil or other hydraulic fluid from a reservoir 18 through a conduit 20. The pump delivers fluid through conduit fitting 24 to the common supply port of the first chamber 26 of first and second, series connected inlet chambers provided in the single housing of the valve unit 14. Under selective control by the shiftable spools 10 and 12, pressure fluid is transmitted to either of two control line connections 28 and 30 and through either of two control line connections 32 and 34 leading respectively to the motor ports of a boom cylinder 36 and a bucket cylinder 38 of a tractor loader 40. Pressure fluid is simutaneously being returned from either or both cylinders 36 and 38 through the other control line connection of each cylinder and through the valve unit 14 to a return 42 to the reservoir 18. Two external return conduits 44 and 46 are illustrated between the valve unit 14 and the return line 42, but in practice they will be joined together internally of the unit 14 if both are used as direct returns.

The cylinders 36 and 38 are double acting motors arranged with the former cylinder 36 secured at the head end to a fixed frame pivot 48 on a supporting frame element carried by the tractor 40, and secured at the rod-connected end to a pivot 50 carried by the mid-portion of a bucket boom 52. The bucket boom 52 has forwardly extending side members secured at their fixed ends on pivots which are carried by the supporting frame and one of which is indicated at 54.

At the free-swinging forward end, the boom 52 has a pivot connection 56 by which it supports a bucket 58. The bucket cylinder 38 has its rod-connected end secured to a pivot 60 on the bucket 58 and has its head end connected to a pivot 62 fixed to the intermediate portion of the boom 52. Two more cylinders 36 and 38 can be provided and similarly installed on the opposite side of the tractor 40 but are not illustrated.

A bucket operating lever or handle 64 has links 66 at the lower end thereof, connecting it to the bucket spool 12. The handle 64 oscillates on a fixed axis established by a pivot pin 68 which connects the mid-portion of the handle 64 and a pair of cantilever bracket bars 70 carried by the unit 14.

A boom operating lever or handle 72 for the companion valve spool 10, oscillates on a fixed axis established by a handle pin 74 journaled in a cantilever bearing 76 which is integral with the housing of the unit 14. The handle pin 74 at one side of the bearing 76 supports the handle 72 and a pin sleeve 78; at the opposite side of the handle pin 74 supports a valve operating lever 80. The handle 72 and the lever 80 are pinned fast to the handle pin 74 respectively at 82 and 84. Two links of which one is illustrated at 86, connect the upper end of the lever 80 to the boom spool 10.

A system relief valve 88 is connected to the first inlet chamber 26 (FIG. 4) and the two individual relief valves 90 and 92 as shown in FIG. 1 are provided for relieving pressure respectively in the rod-connected end of the boom cylinder 36 and in the head end of the boom cylinder 36. Also appearing in FIG. 1 are a boom-raise check valve 94 which is provided at one side of the unit 14 and a bucket-extend check valve 96 which is provided on the opposite side. Another check valve 97 is visible beyond the right end of the pin 74 and is presently described in connection with the valve unit 14. The unit 14 has plugs indicated at points 98 and 100 in FIG. 1 to close the housing fluid tight at those points.

In operation, the handles 64 and 72 are pivoted forwardly at the outset to cause the cylinder 36 to lower the boom 52 and to cause the cylinder 38 to extend whereupon the bucket 58 takes a scooping or digging position shown by the dotted lines 58a in FIG. 1. The operator advances the tractor 40 toward the material thus filling the bucket 58a and then simultaneously starts retracting the bucket cylinder 38 and extending the boom cylinder 36. When the load is thus raised from the ground, it is transported on the tractor 40 to a position where, with the bucket held at an elevated point by means of the boom 52, the bucket cylinder 38 is extended whereby the bucket unloads in the dumping position indicated by the dotted lines 58b in FIG. 1.

The operator then returns the tractor to its starting point, resumes the digging position, and the operation is repeated.

In FIG. 2, the spool 10 is slidably received in a first spool bore section of the valve unit 14. The first inlet chamber 26 has a means, not shown, connecting it in series with the second inlet chamber 202 which has been referred to and which intersects the spool bore. A neutral bypass port 216 in the bore establishes communication between the chamber 202 and an adjacent drain passage 203 which intersects the bore and which drains through a fluid return port into the return conduit 46. Another passage 204 has opposite sections at the passage ends 204a and 204b which intersect the spool bore.

A head connected circuit control passage 206 has a mid-portion intersecting the spool bore and the control passage is connected through a work port and the end connection 28 to the head end of the boom cylinder 36. The relief valve 92 is connected between the circuit controlling passage 206 and the fluid return conduit 46 and is preloaded under spring tension to provide cushioned relief for the head end of the boom cylinder 36. A rod end connected circuit control passage 207 intersects the spool bore at one end and communicates through a work port and the end connection 30 with the rod connected end of the cylinder 36. The cylinder 36 is liquid tight, having a sealed rod bearing 218 slidably supporting the piston rod for a piston 220 within the cylinder 36. The relief valve 90 is connected between the rod end connected circuit controlling passage 207 and the drain connected chamber 212b and serves as a cushion relief for the rod-connected end of the boom cylinder 36. The valve 90 further suffices in a relief capacity as evident in FIG. 6, serving to relieve the head end of the bucket cylinder 38 during the lift level operation as the regenerative oil is directed from the rod-connected end of the boom cylinder 36 to the head end of the bucket cylinder 38.

In FIGS. 2, 4 and 5, a first cross connection passage 210 has an end section 210a connecting the passage to a passage 211 which intersects the first spool bore section. The check valve 97 in the passage end 210a opens to conduct flow only in the direction from passage 211 to 210. In FIGS. 4 and 5, the opposite end section 210b of the passage 210 intersects the spool bore 254 in which spool 12 is slidable.

In FIGS. 2-5 a generally longitudinally extending passage 212 has a passage end portion 212b (FIG. 5) intersecting both the first and the second spool bore sections at one end and has another passage end portion 212a which intersects the first and second bore sections at the opposite end, and communicates with the return conduit 44 (FIG. 5). Also, a second cross connection passage 214 between the spool sections intersects the first bore 216 at one end and is closed at the opposite end by a check valve 222 to prevent reverse flow through a circuit control passage 208 into the second spool bore section 254.

If, as best understood from FIGURE 2, the user inserts another valve downstream from the described valve he can eliminate the fluid connection between the fluid return conduit 46 and drain passage 203 by plugging housing outlet 46, and inserting a conduit fitting in lieu of plug 98, whereby the freely circulating pumped fluid from the drain passage 203 is not returned directly to the reservoir. This modification enables the passage 203 to communicate with a pressure-beyond port at the fitting useful to direct the pumped oil to another valve or valves, not shown, to operate additional equipment on the tractor 40, such as hydraulic backhoe apparatus. The flow from relief valve 92 is free to communicate with return conduit 46 via an annular groove around the fitting that replaces the plug 98.

The valve spool 10 is urged toward a neutral or centered position A, as shown in FIG. 2, by a conventional spring centering assembly designated as a whole by the numeral 224. The spool 10 is movable by the handle 72, part way inwardly into a boom-lower position B, and can be further shifted into a boom-float position C, in which detent groove 226 on a centrally located main land portion 228 of the spool is engaged by a pair of opposed spring pressed detents 230 (FIG. 3) so as to retain the spool in position. From neutral position A, the spool 10 can be shifted outwardly by the handle 72 into a boom-raise, full power position E, and can be shifted further outwardly into a lift-and-level position D. The spool is detented in its boom-raise position E owing to the engagement of another detent groove 232 on the main land portion 228, and the spring detents 230. The bucket cylinder spool 12 is, for purposes of the operation descriptions to follow, in a neutral bypass position unless otherwise stated.

Neutral bypass operation

With the spools 10 and 12 in their respective neutral positions A and F, as shown in FIG. 5, pump supply fluid flows through the two series connected supply chambers 26 and 202, through spool groove 234 into fluid return passage 203, and thence through the return port 46 and the connected conduit to the reservoir. Hence there is free fluid circulation from the pump through the control valve and back to the reservoir. A spool land portion 236 blocks a port leading from the control passage 206 to the fluid return 203 so as to prevent fluid flow therebetween; another spool land portion 238 blocks a port leading from the control passage 206 to the passage end 204a, and passage 204 so as to prevent communication therebetween. The main land portion 228 of the spool blocks a bore port leading from the circuit control passage 207 to the passage 204, and prevents communication therebetween; another spool land portion 240 blocks a bore port leading from the control passage 207 to the passage 211 preventing communication therebetween. Hence the boom cylinder 36 is hydraulically locked against movement. The plunger in the bucket cylinder 38 is also locked.

Boom lower without automatic bucket levelling

When the spool 10 is shifted to position B, flow through the neutral bypass passages 202 and 203 is blocked by the land portion 236, and pumped fluid flows from fluid inlet passage 26 through check valve 94 (FIG. 4), passage 204, passage end 204b, to the control circuit passage 207, through conduit 30 to the rod or bearing end of the boom cylinder 36.

Fluid from the head end of the cylinder 36 flows through conduit 28, passage 206, passage 203, and into return conduit 46.

Boom raise without automatic bucket levelling

When maximum lift or breakaway power is desired, rather than speed, the operator shifts spool 10 to position E. In such position pressure fluid is supplied to the head end of boom cylinder 36 through passages 26, 204a, 206 and conduit 28. Fluid flows from the rod end through conduit 30, passages 207, 211, 212b, 212a, and passage 44 to reservoir.

Boom-float position

When the spool 10 is in the detented position C, pump supplied oil flows from inlet 26 through passages 202, 212a, and to return passage 44. The head end of cylinder 36 is connected to reservoir through conduit 28, circuit control passage 206, passage 203, passage 212a to fluid return conduit 46. The rod end of cylinder 36 is also connected to reservoir through conduit 30, circuit control passage 207, passages 211, 212b, 212a (FIG. 5) and fluid return passage 44. The boom 52 is thus free to move up or down in response to displacement forces, but the spool 10 is held in position by the detents 230 (FIG. 3).

Boom raise with automatic bucket levelling

When the spool 10 is moved into position D, as shown in FIG. 6, a series regenerative circuit is established, in which the grooves of the spool 10 connect the rod end of cylinder 36 to the head end of bucket cylinder 38, and the rod end of bucket cylinder 38 to the head end of boom cylinder 36, thus placing the two cylinders hydraulically in series. Simultaneously, flow of pressure fluid to either of the return passages 203 or 212a is blocked.

Pressure fluid flows from supply chamber 26 through check valve 94, passage 204 (FIG. 4), passage end 204a (FIG. 6) and passage 206, through line 28 to the head end of cylinder 36, to raise the boom.

Fluid flows from the rod end of cylinder 36 through line 30 to passage 207, through passages 211, 210b and 209 into line 32, and to the head end of bucket cylinder 38, thus preventing cavitation in the head end of that cylinder. Excess fluid is disposed of through relief valve 90, to return.

Simultaneously fluid flows from the rod end of bucket cylinder 38 through line 34, passage 208, past check 222 into passage 214, through passage 204a to passage 206 through line 28 to the head end of boom cylinder 36, thus supplementing pressure fluid from the pump to enable the boom to be raised at a faster rate than it could be raised by pump provided fluid alone.

From the above description it will be understood that by moving control lever 72 *only* (to move spool 10 into position D), the operator not only causes the boom to raise, but also causes the bucket to maintain a level position regardless of the inclination of the boom at any given time during its movement. To accomplish this operation the respective displacements and strokes of the two cylinders must be properly related. This can easily be calculated by any design engineer. The linkage geometry must also be taken into consideration for a proper design.

Bucket operations produced by operator movement of the spool 12 will now be described. Unless otherwise stated it will be understood that spool 10 is in its neutral position A, as it is shown in FIG. 5. It will also be understood that when both spools 10 and 12 are in ther respective neutral positions, as shown in FIG. 5, the plungers in the respective cylinders are hydraulically locked against movement in either direction, and there is free circulation of fluid from the pump, through the valve and back to reservoir, as previously described.

Bucket curl position

When the operator shifts spool 12 to position G, pressure fluid from the pump is forced to flow from inlet 26 through check valve 96 (FIG. 4) into passage 205, thence into passage 208 and out through conduit 34 to the rod end of bucket cylinder 38, causing the bucket to pivot clockwise, as viewed in the drawings. Fluid flows from the head end of cylinder 38 through conduit 32, passages 209, 213b, 212b, 212a and to the reservoir through passage 44 and conduit 46.

Bucket—power dump

To obtain maximum dumping power the operator moves spool 12 to position H. Pressure fluid from the pump passes from inlet 26 through check valve 96 (FIG. 4) to passage 205, passages 210b and 209, and through conduit 32 to the head end of bucket cylinder 38. Return flow from the rod end travels through conduit 34, passages 208, 213a, 213, 213b, 212, and conduit 44 to reservoir. Check valve 97 (FIGS. 2 and 4) prevents pressure fluid from escaping into return passage 212 through passages 210 and 211.

Bucket—fast dump

When spool 12 is moved to position I, as shown in FIG. 7, an anti-cavitation or regenerative circuit is formed. Pressure fluid from the pump passes to the head end of the cylinder 38 through passages 26, 205, 210b, 209 and conduit 32. However, fluid from the rod end of the cylinder is blocked from returning to the reservoir through passages 213 and 212. Instead, this fluid travels through passages 213 and 209 and supplements supply fluid flow from the pump into conduit 32, thus preventing cavitation in the head end of cylinder 38 due to movement of plunger 248 at a rate faster than the pump alone could supply fluid to maintain the head end of the cylinder completely full.

For purposes of making a smooth transition between the respective power dump and fast dump positions H and I, the land portion 268 of spool 12 is relieved with a notch 270 so as to open and close the passage end 212b progressively without being abrupt.

When both spools 10 and 12 are in an operating position, it is apparent from FIGURE 4 that pump supplied oil from the inlet supply chamber 26 divides in flow in simultaneously entering the passages 204 and 205 through their respective check valves 94 and 96. These check valves mutually prevent cross flow such as would occur for example when the resisting load being operated by one of the cylinders is excessive enough to tend to reverse the one cylinder so that it would in effect attempt to operate as a pump to feed the other cylinder.

Various combinations and individual shifts of the operating positions of the spools 10 and 12 allow the cylinders 36 and 38 to be controlled separately but simultaneously. For the sake of brevity the circuits will not be traced in detail and can be understood with reference to the foregoing individual descriptions. There is no conflict or cross purpose encountered between the first and second spool bore sections of the valve; one apparent conflict occurs, for example, when the valve spools 10 and 12 take their respective lift level position D and power dump position H of FIGURE 6. The rod end connected circuit control passage 208 which communicates with the second cross connection 214 between the bore sections is also connected through the passage 213 to the reservoir via the fluid return conduit 44. The pressure in passage 208 can thus fall below the pressure in the cross connection 214. However the check valve 222 blocks reverse flow and therefore prevents unwanted dropping of the boom caused by the boom cylinder 36 retracting due to the escape of the fluid from the cross connection 214 to drain.

The relief valve 92 is connected between the circuit controlling passage 206 and the fluid return conduit 46 and is preloaded under spring tension to provide cushioned relief for the head end of the boom cylinder 36.

The relief valve 90 is connected between the rod end connected circuit controlling passage 207 and the drain connected chamber 212b and serves as a cushion relief for the rod connected end of the boom cylinder 36. The valve 90 further serves in a relief capacity as evident in FIGURE 6, serving to relieve the head end of the bucket cylinder 38 during the lift level operation as the regenerative oil is directed from the rod connected end of the boom cylinder 36 to the head end of the bucket cylinder 38.

While a specific embodiment of the invention has been shown and described in detail to illustrate the application of the invention principles, it will be understood that the invention may be embodied otherwise without departing from such principles.

Having described the invention with sufficient clarity to enable those familiar with this art to construct and use it, I claim:

1. A fluid flow control valve capable of directing the flow of fluid between a source of pressure and to at least a pair of hydraulic motors independently, between said motors and a reservoir, between the motors themselves, and between the two ends of a particular motor, said control valve comprising:

a housing having
 (a) a fluid supply port (26) for connection to the source of pressure fluid;
 (b) a fluid return port (44–46) for connection to the system reservoir;
 (c) a first work port (206–28) and a second work port (207–30) for connection to the opposite ends of said first working motor;
 (d) a third work port (209–32) and a fourth work port (208–34) for connection to the opposite ends of said second working motor;
 (e) first and second bores for slidably receiving first and second valve spools; and
 (f) a plurality of internal fluid conducting passages interconnecting the spool bores with each other and with said work ports, interconnecting the supply and return ports with each other and with said spool bores and said work ports, and interconnecting certain of said work ports with each other, all under the selective movement of valve spools in the respective bores;

first and second cannelured valve spools shiftable respectively in said first and second bores to selectively direct the flow of pressure fluid and return fluid between the source, the work ports, and the reservoir;

said first spool being effective in one position (D) to direct pressure fluid from said supply port (26) outward through said first work port, to provide a flow path inward through said second work port to and outward through said third work port, and to provide a flow path inward from said fourth work port and outward through said first work port to supplement the source fluid flowing through said first work port.

whereby in said one position (D) of said first spool the two motors are coupled together and actuated simultaneously in a predetermined coordinated ratio of movement, and the actuation of said first motor is at a faster rate than could be accomplished by the pressure fluid source alone, due to the supplemental fluid supplied by the second motor to the first motor, and a check valve interposed in the flow path between said fourth and said first work port.

2. The control valve described in claim 1, and a check valve interposed in one internal fluid conducting passage and effective, when said first spool is in said one position, to afford flow of excess fluid from said first work port to the return port.

3. The valve described in claim 1, in which said second spool (12) is effective in one position (I) to direct pressure fluid outward through said third work port, and to provide a flow path inward from said fourth work port to said third work port, to supplement the fluid flowing from the source out through said third work port, while blocking flow from said fourth work port to the return port, whereby cavitation is prevented in that end of the second cylinder which is connected to said third work port.

4. The valve described in claim 3, and a check valve affording flow of fluid under excess pressure from the pressure fluid supply port to the return port.

5. A control valve for operating at least a pair of hydraulic motors selectively or simultaneously in response to admitted fluid from a source of pressure, comprising a valve body; a pair of selectively movable, cannelured valve spools movable within said valve body; control means for selectively operating said spools; a plurality of fluid ports in said valve body and intersecting the path of movement of said spools; a common source of pressure and a common reservoir; two of said ports intersecting the path of movement of each spool comprising work ports; two further ports intersecting the path of movement of each spool being in communication with said common source of fluid pressure, and a further pair of ports intersecting the path of movement of each spool respectively being in communication with said common reservoir and vice versa subject to the position of the respective spools; certain of the remaining ports intersecting said path of movement of each spool being in communication with each other and opened and closed by a common spool; the remaining ports intersecting the path of movement of each spool comprising cross ports intersecting the path of movement of both spool members; valve means disposed in each cross port to restrict the flow of fluid therethrough to one directional flow only; movement of said spool members by said control means acting to provide fluid to each work port individually; fluid to each work port simultaneously; at least one of said spool means being moveable to a position to place one of said work ports in a communication with the pressure source and establishing fluid flow between the remaining work ports whereby fluid flow from said pressure source actuates at least one of said motors, the exhaust flow of which passes through one of said cross parts to the work port of the other of said motors.

6. A control valve as defined in claim 5 including a pressure relief valve interposed between said common source of fluid pressure and said common reservoir, said valve relieving excess pressure in either or both of said hydraulic motors.

7. A control valve as defined in claim 5 wherein said valve means in each cross port comprises a pressure responsive check valve interposed in one each of the cross ports intersecting each of said spool members, said valves blocking the cross flow of fluid in one direction through said ports and cushioning pressure flow through said ports in the opposite direction depending on the respective positions of said spool members.

References Cited by the Examiner
UNITED STATES PATENTS

| | | | |
|---|---|---|---|
| 2,860,793 | 11/58 | Lapsley | 214—140 |
| 2,876,921 | 3/59 | Salna | 214—140 |
| 2,881,931 | 4/59 | Mackie | 214—140 |
| 2,914,202 | 11/59 | Wagner | 214—140 |
| 2,980,135 | 4/61 | Tennis | 137—596.12 |
| 2,988,891 | 6/61 | Hemings | 214—140 X |
| 2,990,072 | 6/61 | Mindrum | 214—140 |

M. CARY NELSON, *Primary Examiner.*

HUGO O. SCHULZ, MARTIN P. SCHWADRON,
*Examiners.*